(12) United States Patent
Uekita

(10) Patent No.: US 12,352,639 B2
(45) Date of Patent: Jul. 8, 2025

(54) CUTTING FORCE MEASUREMENT SYSTEM

(71) Applicant: KABUSHIKI KAISHA TOSHIBA, Tokyo (JP)

(72) Inventor: Masahiro Uekita, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 18/063,903

(22) Filed: Dec. 9, 2022

(65) Prior Publication Data

US 2023/0251145 A1 Aug. 10, 2023

(30) Foreign Application Priority Data

Feb. 8, 2022 (JP) ................................. 2022-017888

(51) Int. Cl.
*G01L 1/16* (2006.01)
*G01L 5/00* (2006.01)

(52) U.S. Cl.
CPC .............. *G01L 1/16* (2013.01); *G01L 5/0061* (2013.01)

(58) Field of Classification Search
CPC ... G01L 1/2243; G01L 1/2231; G01L 1/2206; G01L 1/04; G01L 1/142; G01L 1/2218; G01L 1/26; G01L 1/18; G01L 1/14; G01L 1/2287; G01L 1/20; G01L 1/205; G01L 1/16; G01L 1/2262; G01L 1/146; G01L 1/2225; G01L 1/22; G01L 5/10; G01L 1/2237; G01L 5/165; G01L 1/2281; G01L 5/106; G01L 5/1627; G01L 1/144; G01L 1/2212; G01L 5/162; G01L 5/0004; G01L 1/044; G01L 5/101; G01L 5/108; G01L 1/2293; G01L 5/0019; G01L 5/0076; G01L 9/006; G01L 25/00; G01L 5/136; G01L 1/005; G01L 1/225; G01L 1/2268; G01L 5/107; G01L 1/148; G01L 9/0054; G01L 5/228; G01L 1/125; G01L 5/0038; G01L 5/102; G01L 9/0072; G01L 1/02; G01L 1/042; G01L 5/223; G01L 5/226; G01L 9/0042; G01L 9/008; G01L 1/12; G01L 1/2275; G01L 9/0002; G01L 9/0052; G01L 9/0055; G01L 1/00; G01L 5/0061; G01L 5/225; G01L 5/06; G01L 1/2256; G01L 3/1457; G01L 5/0052; G01L 5/0085;

(Continued)

(56) References Cited

U.S. PATENT DOCUMENTS 5,095,764 A * 3/1992 Saner ...................... G01L 1/106
 177/210 FP
11,462,673 B2 * 10/2022 Yoshida .................... G01L 1/16

(Continued)

FOREIGN PATENT DOCUMENTS

DE 102023204633 A1 * 4/2024
EP 3561469 10/2019

(Continued)

*Primary Examiner* — Andre J Allen
(74) *Attorney, Agent, or Firm* — Knobbe, Martens, Olson & Bear, LLP

(57) ABSTRACT

A sensor unit according to an embodiment includes a piezoelectric sensor having a wire shape, and a measurement part including an abutting surface formed with a guide groove that holds a part of the piezoelectric sensor and abutting a measurement object at predetermined pressure.

5 Claims, 9 Drawing Sheets

(58) Field of Classification Search
CPC ......... G01L 5/047; G01L 5/167; G01L 1/127; G01L 1/24; G01L 5/103; G01L 5/161; G01L 9/0073; G01L 1/122; G01L 1/162; G01L 5/0057; G01L 5/12; G01L 5/22; G01L 5/24; G01L 5/243; G01L 9/007; G01L 9/06; G01L 9/12; G01L 5/00; G01L 5/0009; G01L 5/164; G01L 5/169; G01L 9/0035; G01L 9/0051; G01L 1/048; G01L 13/025; G01L 19/04; G01L 5/0028; G01L 5/0033; G01L 9/0047; G01L 9/0061; G01L 9/0075; G01L 9/045; G01L 1/06; G01L 1/10; G01L 1/106; G01L 1/183; G01L 1/255; G01L 19/141; G01L 3/103; G01L 5/009; G01L 9/0044; G01L 1/242; G01L 19/147; G01L 23/18; G01L 3/102; G01L 3/108; G01L 3/1435; G01L 3/1478; G01L 5/0071; G01L 5/04; G01L 5/133; G01L 5/14; G01L 5/16; G01L 5/173; G01L 5/221; G01L 7/08; G01L 7/082; G01L 9/0005; G01L 9/003; G01L 9/0041; G01L 9/0048; G01L 9/0098; G01L 9/04; G01L 9/065; G01L 9/08; G01L 9/10; G01L 1/08; G01L 1/086; G01L 1/25; G01L 13/023; G01L 15/00; G01L 17/005; G01L 19/0007; G01L 19/0069; G01L 19/0076; G01L 19/0092; G01L 19/02; G01L 19/0618; G01L 19/0645; G01L 19/148; G01L 23/10; G01L 27/002; G01L 27/007; G01L 3/106; G01L 3/1471; G01L 5/0014; G01L 5/0023; G01L 5/0047; G01L 5/008; G01L 5/042; G01L 5/045; G01L 5/105; G01L 5/13; G01L 5/166; G01L 5/168; G01L 5/20; G01L 9/0001; G01L 9/0022; G01L 9/0045; G01L 9/0058; G01L 9/0064; G01L 9/0085; G01L 9/0089; G01L 9/14; G01L 9/16; G01L 1/046; G01L 1/083; G01L 1/165; G01L 1/246; G01L 1/247; G01L 11/00; G01L 11/04; G01L 13/028; G01L 13/06; G01L 19/0038; G01L 19/0061; G01L 19/0084; G01L 19/0654; G01L 19/10; G01L 19/14; G01L 19/146; G01L 19/16; G01L 2019/0053; G01L 23/04; G01L 23/125; G01L 23/14; G01L 23/28; G01L 27/005; G01L 3/00; G01L 3/10; G01L 3/104; G01L 3/109; G01L 3/12; G01L 3/14; G01L 3/1407; G01L 3/1421; G01L 3/1442; G01L 3/24; G01L 3/242; G01L 3/247; G01L 5/0042; G01L 5/0066; G01L 5/08; G01L 5/1623; G01L 5/286; G01L 7/00; G01L 7/02; G01L 7/022; G01L 7/041; G01L 7/063; G01L 7/166; G01L 7/182; G01L 9/00; G01L 9/0004; G01L 9/0016; G01L 9/0019; G01L 9/0027; G01L 9/0033; G01L 9/0079; G01L 9/0086; G01L 9/0092; G01L 9/02
USPC ...................................... 73/862.625–862.642
See application file for complete search history.

(56) References Cited

U.S. PATENT DOCUMENTS

| | | | | |
|---|---|---|---|---|
| 11,647,675 | B2 * | 5/2023 | Tanimoto | H10N 30/60 310/338 |
| 2019/0214542 | A1 | 7/2019 | Yoshida et al. | |

FOREIGN PATENT DOCUMENTS

| | | | |
|---|---|---|---|
| JP | H06-75816 | | 3/1994 |
| JP | 2004282089 | A * | 10/2004 |
| JP | 2005-351781 | | 12/2005 |
| JP | 2006-215859 | | 8/2006 |
| JP | 2007-000251 | | 1/2007 |
| JP | 2007-185409 | | 7/2007 |
| JP | 6655196 | | 2/2020 |
| JP | 6762376 | | 9/2020 |

* cited by examiner

Fx~ Cx1*wireX + Cx2*wireY + Cx3*wireZ

Fy~ Cy1*wireX + Cy2*wireY + Cy3*wireZ

Fz~ Cz1*wireX + Cz2*wireY + Cz3*wireZ

F: COMBINED FORCE

Fx ~ Cx1*wireX + Cx2*wireY + Cx3*wireZ

Fy ~ Cy1*wireX + Cy2*wireY + Cy3*wireZ

Fz ~ Cz1*wireX + Cz2*wireY + Cz3*wireZ

F: COMBINED FORCE

CUTTING FORCE MEASUREMENT SYSTEM

CROSS-REFERENCE TO RELATED APPLICATIONS

This application is based upon and claims the benefit of priority from Japanese Patent Application No. 2022-017888, filed on Feb. 8, 2022, the entire contents of which are incorporated herein by reference.

FIELD

Embodiments described herein relate generally to a sensor unit and a sensor system.

BACKGROUND

In the related art, it has been proposed to use a force sensing system in the diagnosis of conditions related to a machining process. The related technologies are described, for example, in: Japanese Patent Application Laid-open No. 2007-000251; Japanese Patent Application Laid-open No. 2007-185409; Japanese Patent Application Laid-open No. 2006-215859; and Japanese Examined Patent Publication No. H6-75816.

However, in the related art, a ceramic piezoelectric element has been used in the field where a high sensitivity and high dynamic range is required as a force sensor, but there are many restrictions on a workpiece size, and a specially designed unit according to a processing load level is necessary, resulting in high cost and obstruction to widespread use.

The present invention has been made to solve the above-described problem, and an object of the present invention is to provide a sensor unit and a sensor system, capable of constructing a low-cost and high-sensitivity force sensing system with few restrictions on a workpiece size.

DETAILED DESCRIPTION

An embodiment is described next with reference to the drawings.

Figure 1:
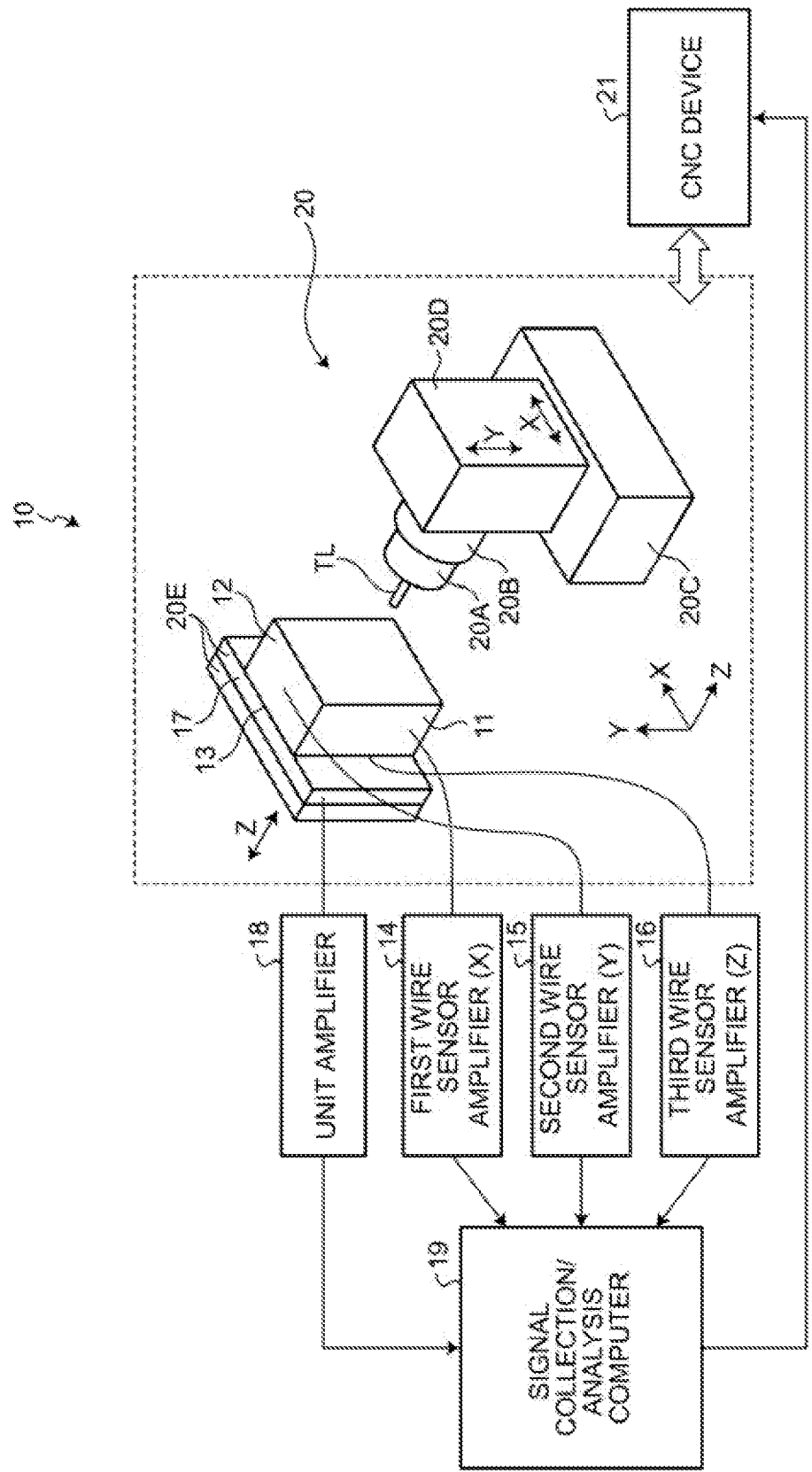
FIG. 1 is a schematic configuration block diagram of a measurement system according to an embodiment.

FIG. 1 is a schematic configuration block diagram of a measurement system of the embodiment.

A measurement system 10 is constructed as a cutting force measurement system that measures a cutting force during cutting of an object to be machined as a sense of force.

The measurement system 10 includes a first wire sensor 11 that detects a cutting force in an X-axis direction of a measurement object OBJ as an object to be machined, a second wire sensor 12 that detects a cutting force in a Y-axis direction of the measurement object OBJ, a third wire sensor 13 that detects a cutting force in a Z-axis direction of the measurement object OBJ, a first wire sensor amplifier 14 that amplifies and outputs an output signal of the first wire sensor 11, a second wire sensor amplifier 15 that amplifies and outputs an output signal of the second wire sensor 12, a third wire sensor amplifier 16 that amplifies and outputs an output signal of the third wire sensor 13, a table-type measuring unit 17 used for calibrating the first wire sensor 11 to the third wire sensor 13, a unit amplifier 18 that amplifies and outputs an output signal (3-channel) of the table-type measuring unit 17, a signal collection/analysis computer 19 that calibrates the output signals of the first wire sensor amplifier 14 to the third wire sensor amplifier 16 on the basis of the output signals of the first wire sensor amplifier 14 to the third wire sensor amplifier 16 and the unit amplifier 18, and a computerized numerical control (CNC) device 21 that numerically controls a machining device 20 (20A, 20B, 20C, 20D, and 20E) on the basis of a predetermined NC program on the basis of an analysis result of the signal collection/analysis computer 19.

In the above configuration, the machining device 20 includes a tool holder 20A that holds a machining tool (for example, cutting tool) TL such as a drill/end mill, a tool spindle 20B that holds the tool holder 20A and rotationally drives the machining tool TL, an X table 20C that drives the tool spindle 20B in an X direction, a Y table 20D that drives the tool spindle 20B in a Y direction, and a Z table 20E that drives the measurement object OBJ, which is the object to be machined, in a Z direction.

Figure 2:
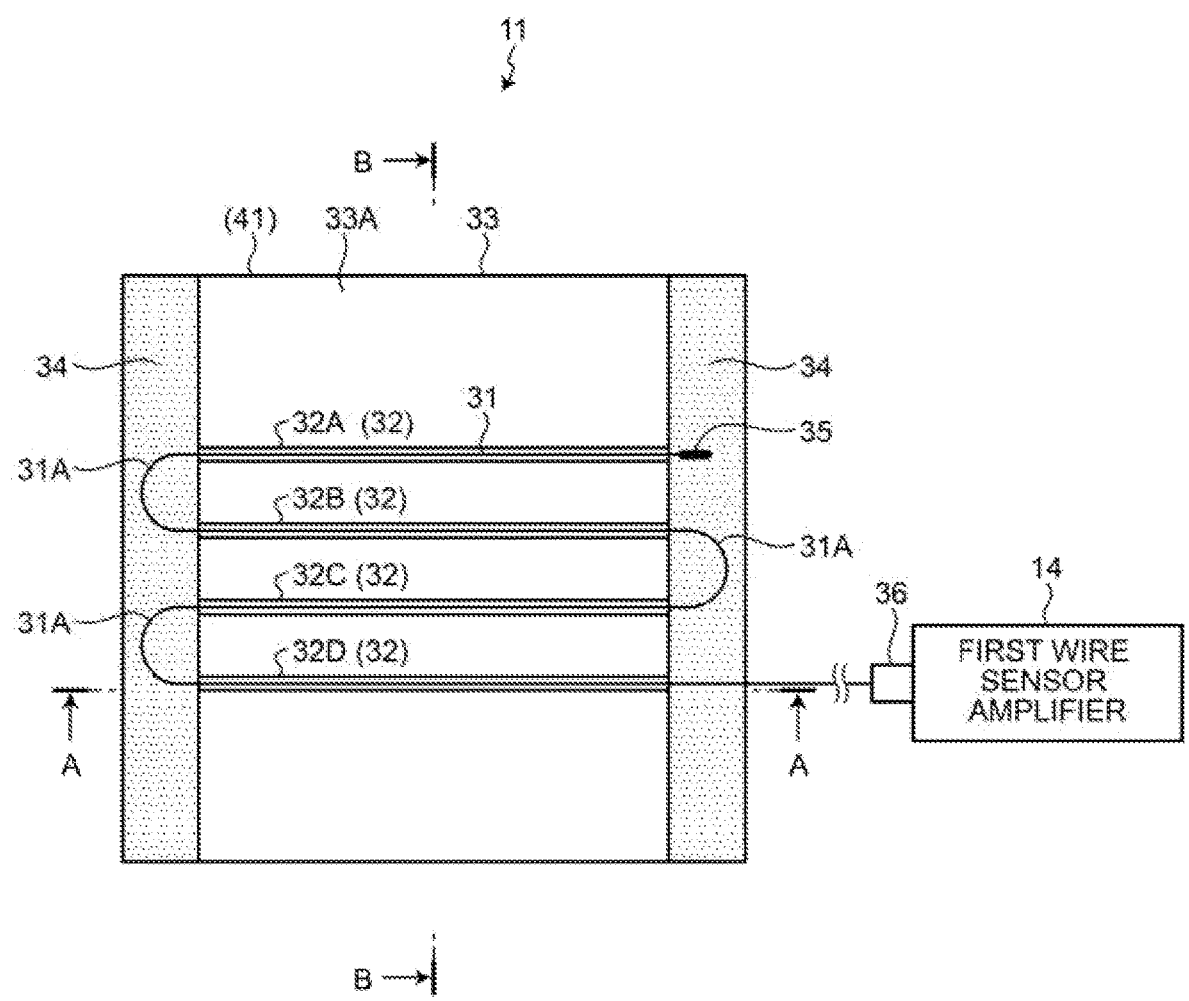
FIG. 2 is a front view of a wire sensor.

The first wire sensor 11, the second wire sensor 12, and the third wire sensor 13 function as a sensor unit. FIG. 2 is a front view of the wire sensor.

Since the first wire sensor 11 to the third wire sensor 13 have the same configuration, the first wire sensor 11 is described as an example in FIG. 2.

The first wire sensor 11 includes a piezoelectric sensor 31 having a wire shape, an abutting part 33 having an abutting surface 33A formed with guide grooves 32 (32A, 32B, 32C, and 32D) for partially holding the piezoelectric sensor 31, except for redundant portions 31A of the piezoelectric sensor 31 and abutting on the measurement object OBJ, which is the object to be machined, at predetermined pressure, cushioning members (for example, anti-vibration rubber) 34 provided along side edges of the abutting part 33 where the redundant portions 31A of the piezoelectric sensor 31 are provided, a protective tube 35 provided on a leading edge side of the piezoelectric sensor 31, and a connector 36 electrically connected to the piezoelectric sensor 31 on a base end side, which is an output end of the piezoelectric sensor 31.

In FIG. 2, the abutting part 33 is provided on the rear side thereof with a pressurizing part 51 (see FIG. 4) that presses the abutting part 33 against the measurement object OBJ during measurement to maintain an abutting state.

The abutting part 33 and the pressurizing part 51 serve as a measurement part.

In the above configuration, the guide grooves 32A, 32B, 32C, and 32D have the same length.

This is to ensure that the contribution (voltage generated by the piezoelectric sensor 31 in each of the guide grooves 32A, 32B, 32C, and 32D) is the same when increasing the generated voltage and contributing to the improvement of sensitivity.

The example in FIG. 2 illustrates a case where the guide grooves 32 are configured as the four guide grooves 32A to 32D, but one or an arbitrary number of guide grooves 32 can be provided. In this case, when m guide grooves 32 (m is an integer of 2 or more) are provided, an output voltage of the wire sensor can be approximately m times higher than that in a case where one guide groove is provided, thereby improving sensitivity. Details thereof are described below.

Figure 3:
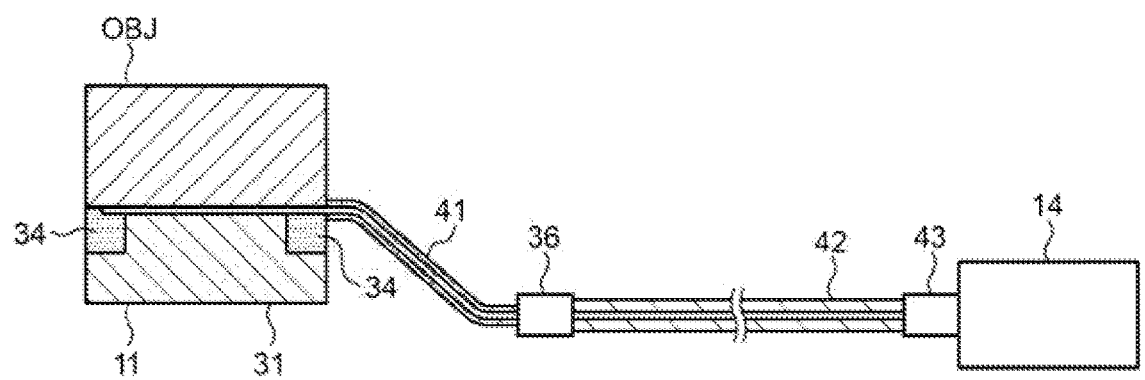
FIG. 3 is a cross-sectional end view of the wire sensor taken along line A-A in FIG. 2.

FIG. 3 is a cross-sectional end view of the wire sensor taken along line A-A in FIG. 2.

As illustrated in FIG. 3, on the base end side of the piezoelectric sensor 31 of the first wire sensor 11, an extending portion of the piezoelectric sensor 31 between the piezoelectric sensor 31 and the connector 36 is covered with a covering member 41, so that vibration of the extending portion of the piezoelectric sensor 31 is suppressed and adhesion of machining chips (cutting chips or the like) due to machining is prevented.

It is preferable to fix the connector 36 in a location that is less susceptible to vibration during machining.

Moreover, a signal transmission cable between the connector 36 and a connector 43, which is connected to the first wire sensor amplifier 14, is covered with an anti-adhesion member 42 for preventing adhesion of machining chips (cutting chips or the like) due to machining.

As the anti-adhesion member 42, for example, a bellows hose or the like is used.

In the piezoelectric sensor 31, portions extending from the guide grooves 32, particularly, the redundant portions 31A, are made to absorb vibration during machining by the cushioning members 34 as illustrated in FIG. 2 and FIG. 3, so that measurement by a part of the piezoelectric sensor 31 located in the guide grooves 32 (32A to 32D) is not disturbed.

In this case, the cushioning members 34 serve as cushioning holding parts that hold parts of the piezoelectric sensor 31 (particularly, the redundant portions 31A) in a buffered state, other than the part of the piezoelectric sensor 31 accommodated in the guide grooves 32A to 32D.

Although each of the cushioning members 34 has a rectangular cross section, it is also possible to configure an upper surface of the cushioning member 34 in FIG. 3 as a slope so that the cushioning member 34 is separated from the measurement object OBJ along the direction away from the abutting surface 33A of the abutting part 33. In this case, it is preferable to fix the redundant portions 31A to the cushioning members 34 with a fixing member such as an adhesive tape or an adhesive.

Figure 4:
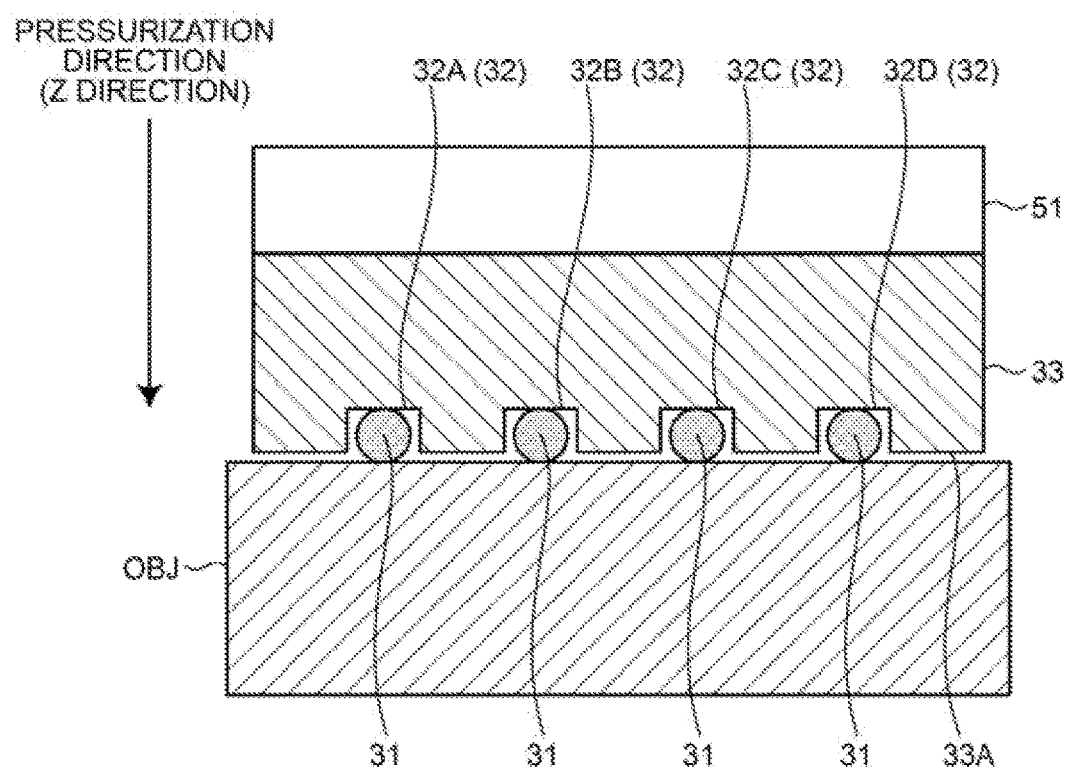
FIG. 4 is a cross-sectional end view of the wire sensor taken along line B-B in FIG. 2.

FIG. 4 is a cross-sectional end view of the wire sensor taken along line B-B in FIG. 2.

The depths of the guide grooves 32A, 32B, 32C, and 32D (lengths in the vertical direction in FIG. 4) are depths by which the accommodated piezoelectric sensor 31 partially protrudes radially from the guide grooves 32A, 32B, 32C, and 32D.

Specifically, when the diameter of the piezoelectric sensor 31 having a wire shape is 0.5 mm, the piezoelectric sensor 31 protrudes by, for example, 0.45 mm.

The widths of the guide grooves 32A, 32B, 32C, and 32D (lengths in the left-right direction in FIG. 4) are set to have a sufficient separation distance so that even when the abutting surface 33A of the abutting part 33 abuts on the measurement object OBJ and the piezoelectric sensor 31 is deformed, the piezoelectric sensor 31 abuts on side walls of the guide grooves 32A, 32B, 32C, and 32D (the wall surfaces in the left-right direction in FIG. 4) and no pressure is applied. That is, the widths of the guide grooves 32A, 32B, 32C, and 32D are set to widths for not preventing the deformation of the piezoelectric sensor 31 in the guide grooves 32A, 32B, 32C, and 32D due to the pressurization.

Specifically, when the diameter of the piezoelectric sensor 31 having a wire shape is 0.5 mm, the widths are each, for example, 1.0 mm.

Next, an operation of the measurement system 10 of the embodiment is described.

Figure 5:
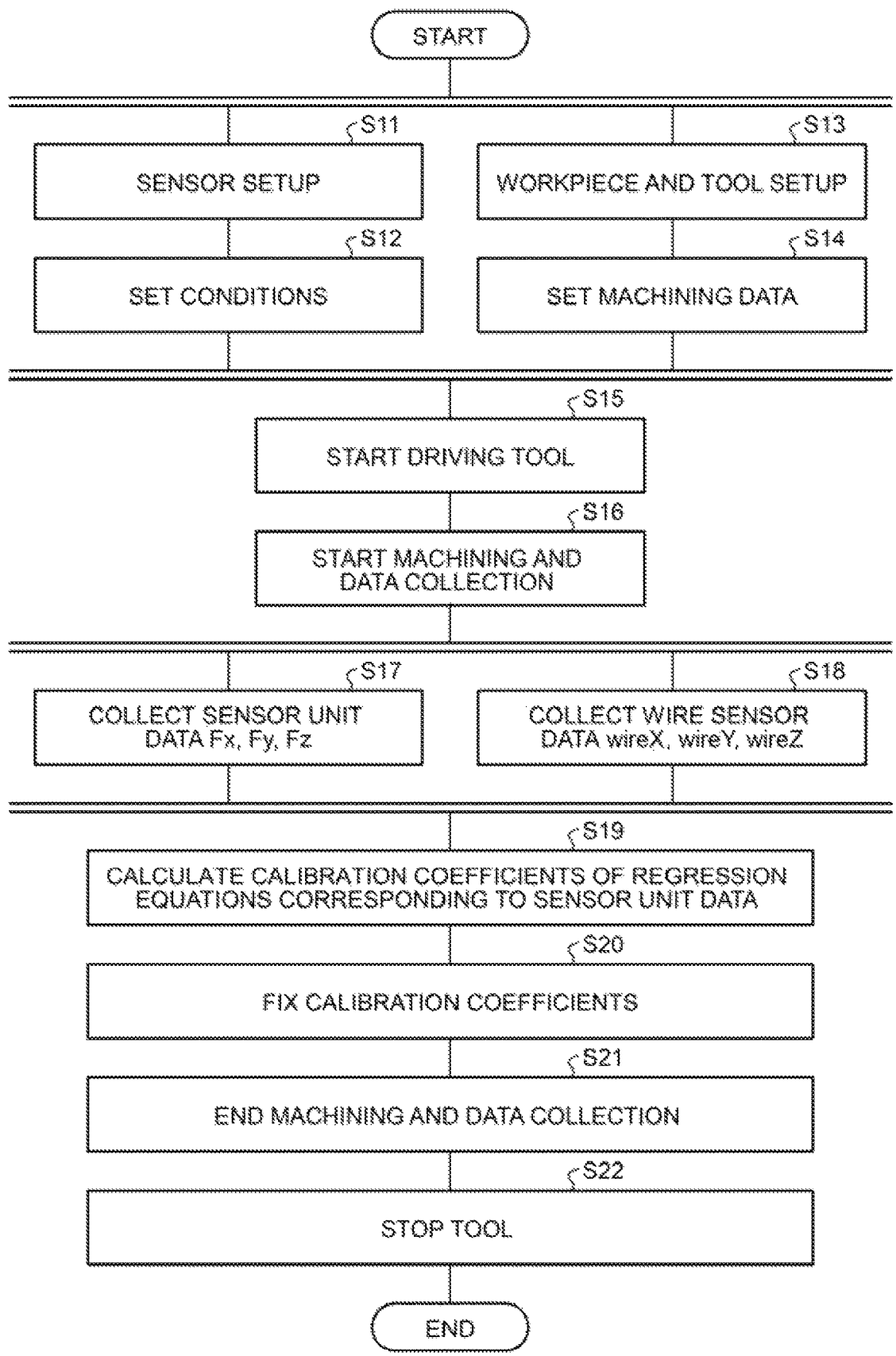
FIG. 5 is a processing flowchart of the measurement system.

FIG. 5 is a processing flowchart of the measurement system.

First, when the measurement system is put into operation, sensor setup, in which the first wire sensor 11 to the third wire sensor 13 constituting the sensor unit and the table-type measuring unit 17 for calibrating the first wire sensor 11 to the third wire sensor 13 are attached to the measurement object OBJ in a predetermined orientation, is performed (step S11).

More specifically, in the table-type measuring unit 17 placed on the Z-table 20E, the measurement object OBJ to which the first wire sensor 11 to the third wire sensor 13 are attached is placed on a surface facing the tool holder 20A holding the machining tool TL.

Subsequently, signal collection conditions for the signal collection/analysis computer 19, for example, a sampling timing, a collection voltage range, and the like are set (step S12).

In parallel with these, a workpiece (measurement object OBJ) and the machining tool TL in the machining device 20 are set up (step S13), and machining data for numerically controlling the machining device 20 are set (step S14).

Subsequently, an operator starts driving the machining tool TL of the machining device 20 (step S15), and starts machining the measured object OBJ and data collection by the signal collection/analysis computer 19 (step S16).

The signal collection/analysis computer 19 thereby collects an output signal of the table-type measuring unit 17 as sensor unit data Fx, Fy, and Fz on the basis of the output of the unit amplifier 18 at each predetermined sampling timing (step S17), in parallel with machining by the machining device 20.

In parallel with the collection of the sensor unit data Fx, Fy, and Fz, the signal collection/analysis computer 19 also collects the output signals of the first wire sensor 11 to the third wire sensor 13 on the basis of the outputs of the first wire sensor amplifier 14 to the third wire sensor amplifier 16 at a sampling timing for synchronizing wire sensor data wireX, wireY, and wireZ with the predetermined sampling timing of the sensor unit data Fx, Fy, and Fz (step S18).

Then, the signal collection/analysis computer 19 stores therein the collected sensor unit data Fx, Fy, and Fz and wire sensor data wireX, wireY, and wireZ in correlation with the sampling timing.

Subsequently, when predetermined numbers of sensor unit data Fx, Fy, and Fz and wire sensor data wirex, wireY, and wireZ are collected, the signal collection/analysis computer 19 performs regression calculation for each of the sensor unit data Fx, Fy, and Fz to obtain a regression equation with the sensor unit data Fx, Fy, and Fz as objective variables (objective parameters) and the wire sensor data wireX, wireY, and wireZ as explanatory variables (explanatory parameters) (step S19).

When the sensor unit data Fx, Fy, and Fz are the objective variables, corresponding regression equations are defined by the following equations, respectively.

$$Fx \approx Cx1 \cdot wireX + Cx2 \cdot wireY + Cx3 \cdot wireZ + Cx4$$

$$Fy \approx Cy1 \cdot wireX + Cy2 \cdot wireY + Cy3 \cdot wireZ + Cy4$$

$$Fz \approx Cz1 \cdot wireX + Cz2 \cdot wireY + Cz3 \cdot wireZ + Cz4$$

In the above equations, Cx1, Cx2, Cx3, Cx4, Cy1, Cy2, Cy3, Cy4, Cz1, Cz2, Cz3, and Cz4 are calibration coefficients.

Then, calibration coefficients corresponding to the calculated regression coefficients are fixed (step S20).

Subsequently, when the machining and the data collection of the machining device 20 are ended (step S21), the signal collection/analysis computer 19 stops the machining tool and ends the process (step S22).

Next, an operation example of the embodiment is described.

In the following description, it is assumed that the calibration coefficients described above are fixed.

FIG. 6 is a diagram for explaining the relationship between the number of guide grooves and an output signal in the wire sensor.

Figure 6A:
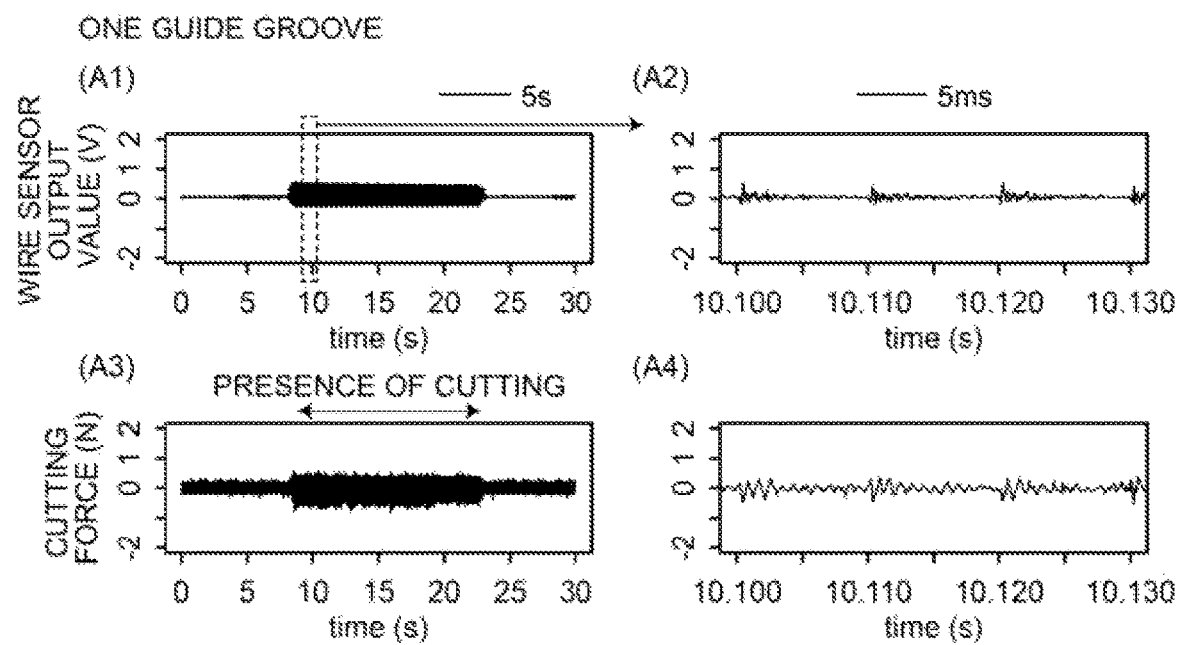
FIGS. 6A and 6B are diagrams for explaining the relationship between the number of guide grooves and an output signal in the wire sensor.

FIG. 6A is an explanatory diagram of an output signal when there is one guide groove.

In this case, FIG. 6A1 is an explanatory diagram of an output signal of a wire sensor (for example, the first wire sensor 11) when there is one guide groove, and FIG. 6A2 is a partially enlarged view of FIG. 6A1.

In FIG. 6A1 and FIG. 6A2, a vertical axis is a wire sensor output value (unit: V) and a horizontal axis is time.

FIG. 6A3 is an explanatory diagram of an output signal of the table-type measuring unit, and FIG. 6A4 is a partially enlarged view of FIG. 6A3.

In FIG. 6A3 and FIG. 6A4, a vertical axis is a cutting force (unit: N) and a horizontal axis is time.

As indicated by a two-headed arrow in FIG. 6A3, it can be seen that the table-type measuring unit detects cutting (machining) period during the cutting (machining) period of the machining device 20, as in the case illustrated in FIG. 6A1. Unlike the output signal in FIG. 6A4, in the enlarged view illustrated in FIG. 6A2, the output signal is a signal that can clearly ascertain the peak value of the cutting force periodically generated by the rotation and movement of the machining tool TL during the cutting (machining) period.

Figure 6B:
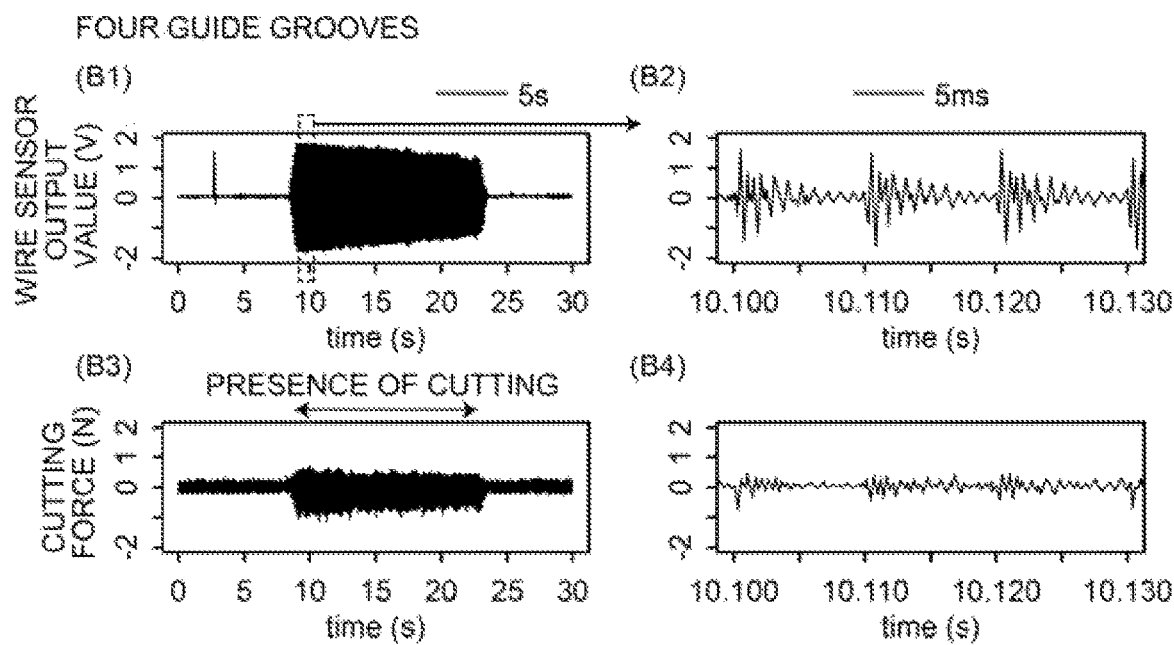

FIG. 6B is an explanatory diagram of an output signal when there are four guide grooves as illustrated in FIG. 2. The machining conditions are the same as those in FIG. 6A.

In FIG. 6B1 and FIG. 6B2, a vertical axis is a wire sensor output value (unit: V) and a horizontal axis is time. In FIG. 6B3 and FIG. 6B4, a vertical axis is a cutting force (unit: N) and a horizontal axis is time.

When the guide grooves 32A, 32B, 32C, and 32D are provided as the guide grooves 32, since the pressure receiving length of the piezoelectric sensor 31 of the wire sensor (for example, the first wire sensor 11) is increased four times, an output voltage is increased four times.

As a consequence, it can be seen that during the cutting (machining) period of the machining device 20, as illustrated in FIG. 6B1, a signal with an amplitude four times larger than that in FIG. 6A1 is output by detecting cutting (machining), and even when compared to a detection signal by the table-type measuring unit illustrated in FIG. 6B4, a highly accurate detection result having a large amplitude is obtained.

As illustrated in FIG. 6B2, the output signal is a signal that can more clearly ascertain the peak value of the cutting force periodically generated by the rotation and movement of the machining tool TL during the cutting (machining) period, as compared to the case of the output signal in FIG. 6A2.

As described above, according to the embodiment, a sensor with high sensitivity can be constructed with a simple configuration (the number of guide grooves is increased and the effective length of the piezoelectric sensor 31 is lengthened), so that a measurement system with high sensitivity and high accuracy can be constructed.

FIG. 7 is an explanatory diagram (part 1) when measurement is performed under the same machining conditions as those during calibration.

FIG. 8 is an explanatory diagram (part 2) when the measurement is performed under the same machining conditions as those during calibration.

In FIG. 7 and FIG. 8, a vertical axis is a cutting force (unit: N) and a horizontal axis is time. The difference between FIG. 7 and FIG. 8 is a time axis scale, and the time axis of FIG. 8 is 10 times larger than the time axis of FIG. 7.

The conditions for acquiring the data are as follows: the diameter of the machining tool TL is 2 mm, the rotation speed of the tool spindle 20B is 8,000 rpm, the feed rate of the table is 150 mm, the axial depth of cut of the machining tool is 0.2 mm, and the radial depth of cut thereof is 2.0 mm.

Figure 7A:
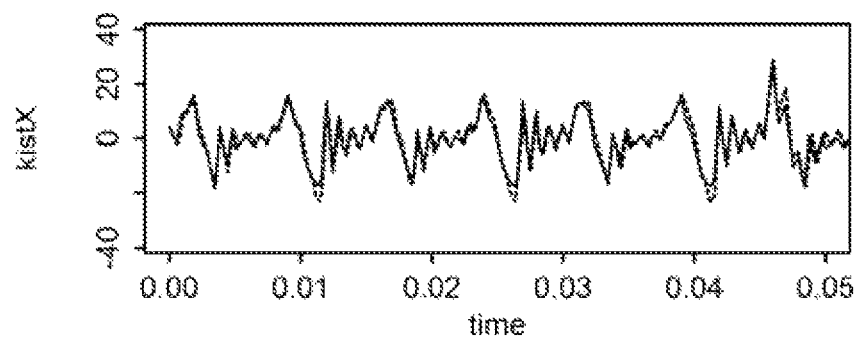
FIGS. 7A to 7D are explanatory diagrams (part 1) when measurement is performed under the same machining conditions as those during calibration.
Figure 8A:
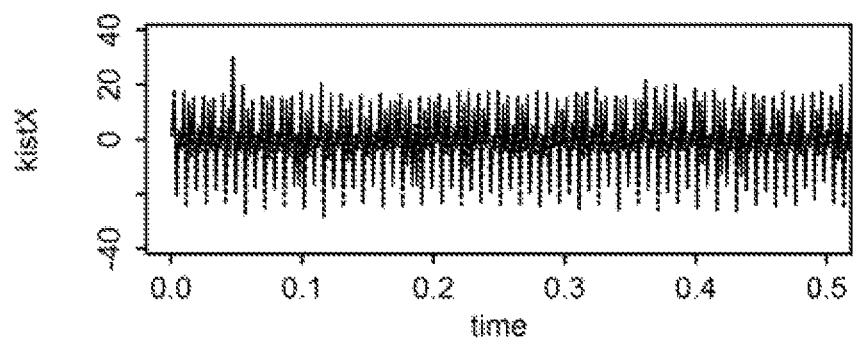
FIGS. 8A to 8D are explanatory diagrams (part 2) when the measurement is performed under the same machining conditions as those during calibration.

FIG. 7A and FIG. 8A are explanatory diagrams of the correspondence between an X-axis direction component of cutting force variation corresponding to the table-type measuring unit 17 and an X-axis direction component of cutting force variation corresponding to the sensor unit (=first wire sensor 11 to third wire sensor 13).

Figure 7B:
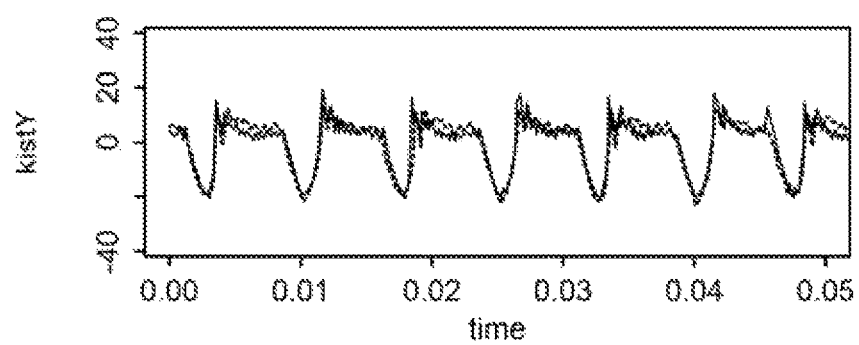
Figure 8B:
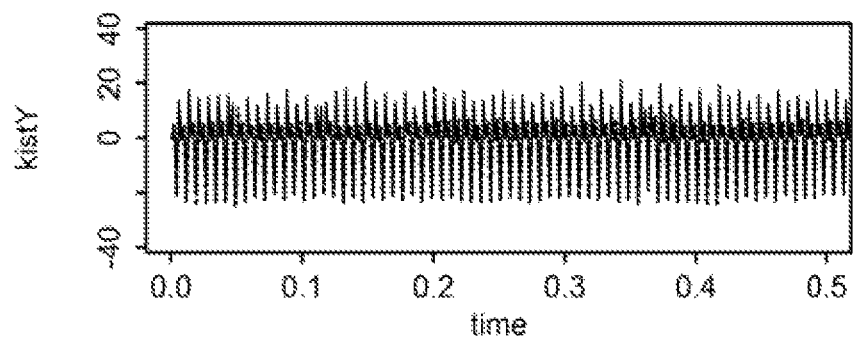

FIG. 7B and FIG. 8B are explanatory diagrams of the correspondence between a Y-axis direction component of the cutting force variation corresponding to the table-type measuring unit 17 and a Y-axis direction component of cutting force variation corresponding to the sensor unit (=first wire sensor 11 to third wire sensor 13).

Figure 7C:
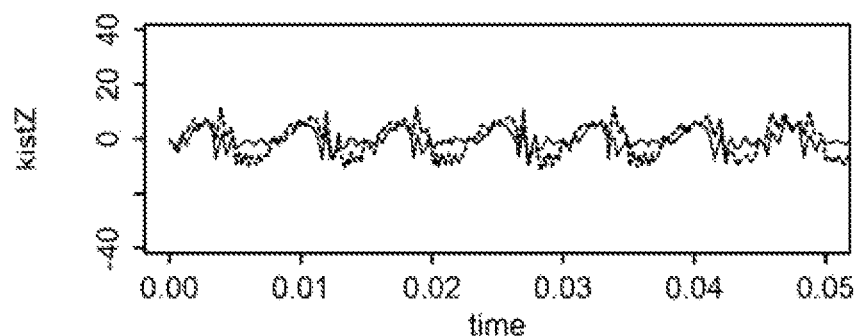
Figure 8C:
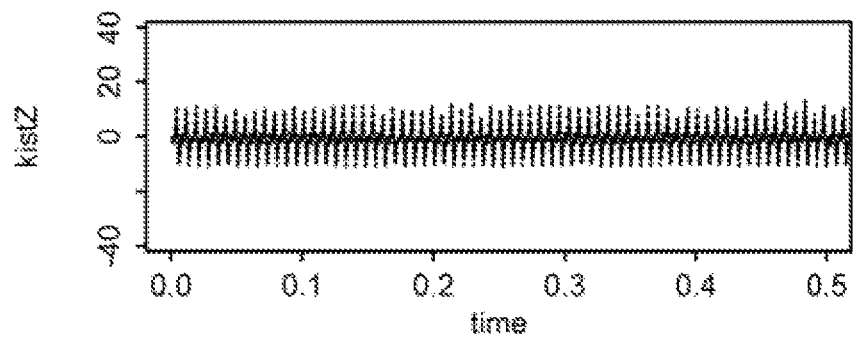

FIG. 7C and FIG. 8C are explanatory diagrams of the correspondence between a Z-axis direction component of the cutting force variation corresponding to the table-type measuring unit 17 and a Z-axis direction component of cutting force variation corresponding to the sensor unit (=first wire sensor 11 to third wire sensor 13).

Figure 7D:
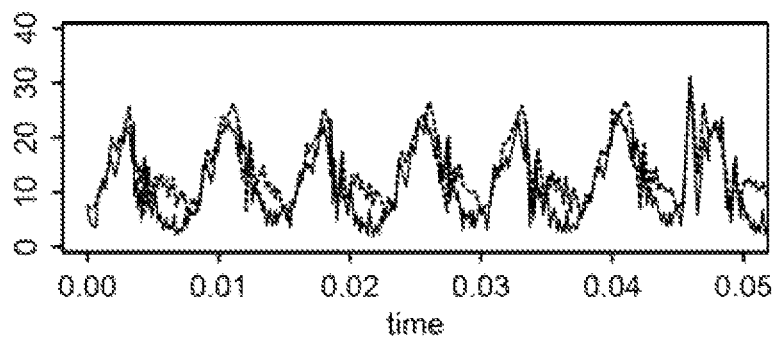
Figure 8D:
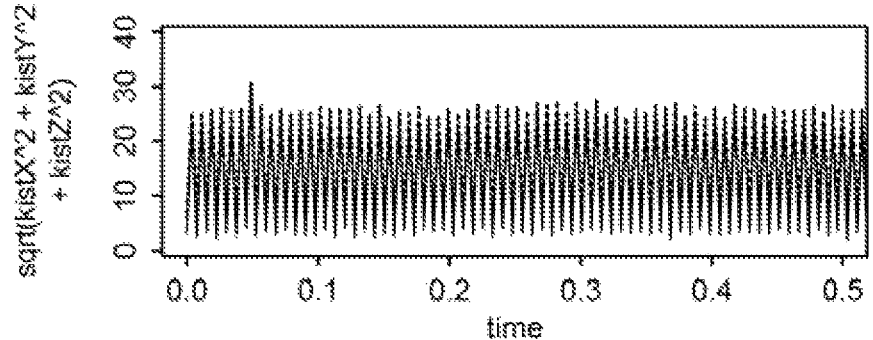

FIG. 7D and FIG. 8D are explanatory diagrams of the correspondence between a combined force that is the square root of the sum of the squares of the X-axis direction component, the Y-axis direction component, and the Z-axis direction component of the cutting force variation corresponding to the table-type measuring unit 17 and a combined force that is the square root of the sum of the squares of the X-axis direction component, the Y-axis direction component, and the Z-axis direction component of the cutting force variation corresponding to the sensor unit (=first wire sensor 11 to third wire sensor 13).

As illustrated in FIG. 7 and FIG. 8, it can be seen that the calibration coefficients Cx1, Cx2, Cx3, Cx4, Cy1, Cy2, Cy3, Cy4, Cz1, Cz2, Cz3, and Cz4 are determined by performing linear regression as described above from the measured data of the output signals of the first wire sensor 11 to the third wire sensor 13 for a predetermined time (for example, 10 seconds), so that machining waveforms (cutting waveforms)

based on the output signals of the first wire sensor 11 to the third wire sensor 13 are well reproduced including a sudden change in a peak value.

FIG. 9 is an explanatory diagram (part 1) of measurement results when the machining conditions are changed for the machining conditions during calibration.

FIG. 10 is an explanatory diagram (part 2) of the measurement results when the machining conditions are changed for the machining conditions during calibration.

In FIG. 9 and FIG. 10, a vertical axis is a detected cutting force (unit: N) and a horizontal axis is time. In FIG. 8, FIG. 9, and FIG. 10, the axial depth of cut is constant at 0.2 mm, and the radial depth of cut is different.

More specifically, in the case of FIG. 8, the radial depth of cut is 2.0 mm, but in the case of FIG. 9, the radial depth of cut is 1.0 mm and in the case of FIG. 10, the radial depth of cut is 0.5 mm.

Figure 9A:
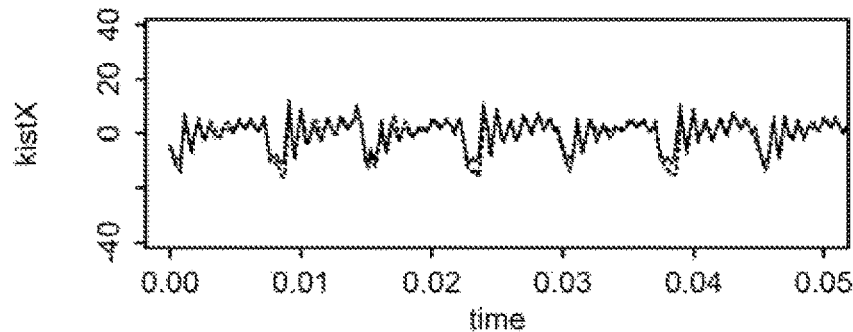
FIGS. 9A to 9D are explanatory diagrams (part 1) of measurement results when the machining conditions are changed for the machining conditions during calibration.
Figure 10A:
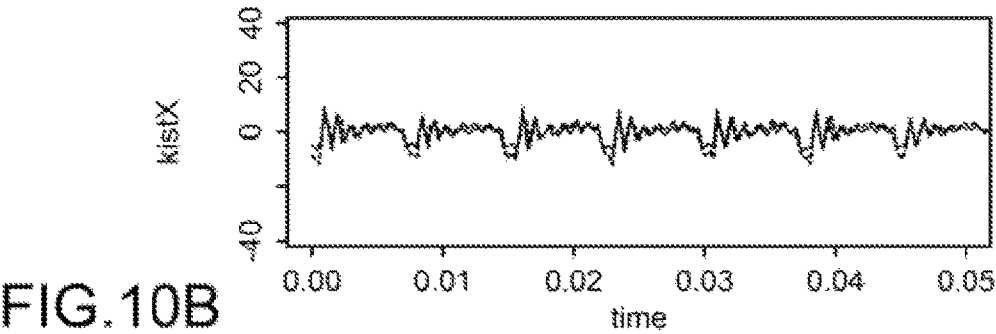
FIGS. 10A to 10D are explanatory diagrams (part 2) of the measurement results when the machining conditions are changed for the machining conditions during calibration.

FIG. 9A and FIG. 10A are explanatory diagrams of the correspondence between an X-axis direction component of cutting force variation corresponding to the table-type measuring unit 17 and an X-axis direction component of cutting force variation corresponding to the sensor unit (=first wire sensor 11 to third wire sensor 13).

Figure 9B:
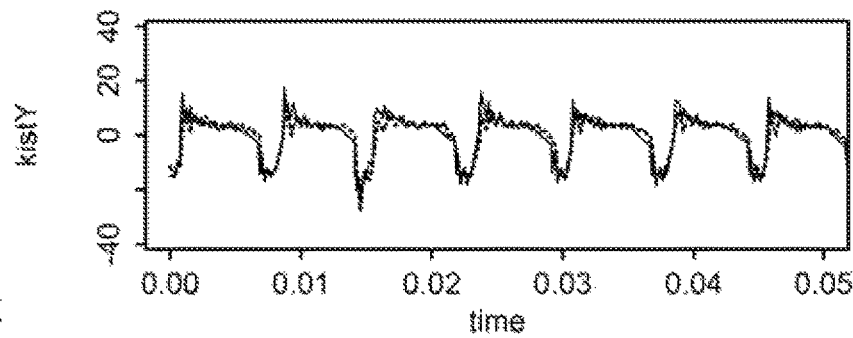
Figure 10B:
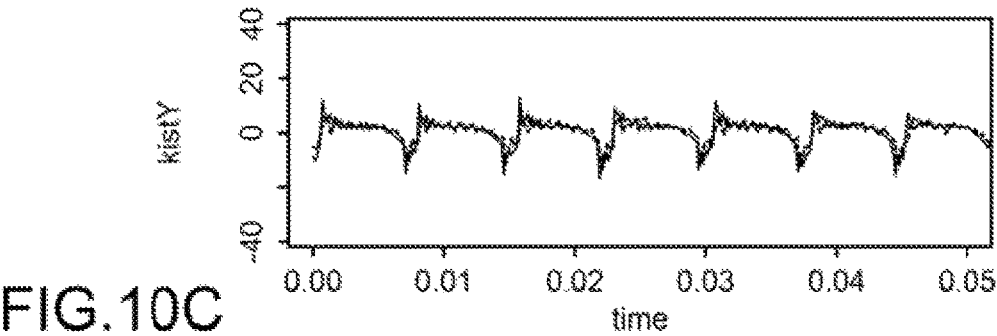

FIG. 9B and FIG. 10B are explanatory diagrams of the correspondence between a Y-axis direction component of the cutting force variation corresponding to the table-type measuring unit 17 and a Y-axis direction component of cutting force variation corresponding to the sensor unit (=first wire sensor 11 to third wire sensor 13).

Figure 9C:
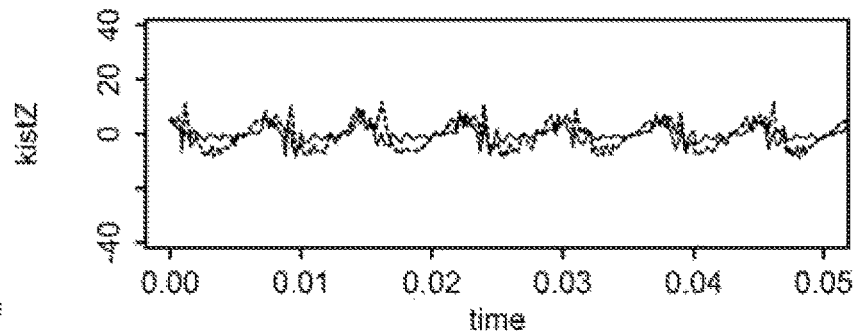
Figure 10C:
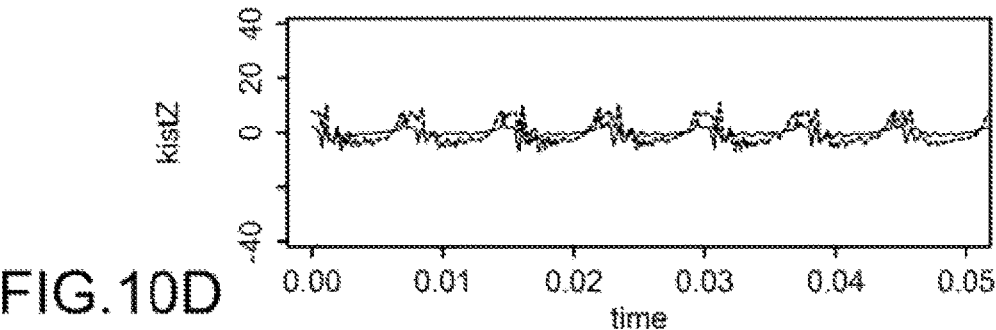

FIG. 9C and FIG. 10C are explanatory diagrams of the correspondence between a Z-axis direction component of the cutting force variation corresponding to the table-type measuring unit 17 and a Z-axis direction component of cutting force variation corresponding to the sensor unit (=first wire sensor 11 to third wire sensor 13).

Figure 9D:
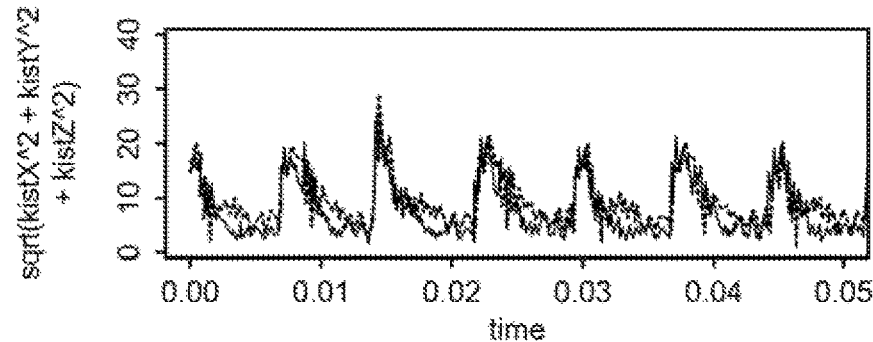
Figure 10D:
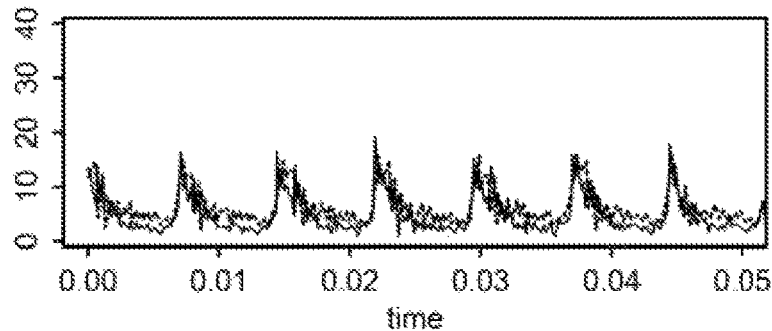

FIG. 9D and FIG. 10D are explanatory diagrams of the correspondence between a combined force that is the square root of the sum of the squares of the X-axis direction component, the Y-axis direction component, and the Z-axis direction component of the cutting force variation corresponding to the table-type measuring unit 17 and a combined force that is the square root of the sum of the squares of the X-axis direction component, the Y-axis direction component, and the Z-axis direction component of the cutting force variation corresponding to the sensor unit (=first wire sensor 11 to third wire sensor 13).

As illustrated in FIG. 9 and FIG. 10, it can be seen that even when the machining conditions (in this example, the radial depth of cut) are changed from the case illustrated in FIG. 8 (the same as the machining conditions during calibration), the measurement results by the table-type measuring unit 17 and the measurement results based on the output signals of the first wire sensor 11 to the third wire sensor 13 in the present application match each other, and machining waveforms (cutting waveforms) based on the output signals of the first wire sensor 11 to the third wire sensor 13 are well reproduced including a sudden change in a peak value.

That is, according to the present embodiment, it can be seen that once the sensitivity coefficients are fixed, a conversion can be properly performed and the machining waveform can be correctly output even though the machining conditions are changed.

Consequently, according to the present embodiment, high sensitivity and high accuracy of force detection can be implemented in the diagnosis of conditions related to a machining process, so that useful knowledge such as early detection of abnormalities can be easily implemented at low cost.

The signal collection/analysis computer of the measurement system of the present embodiment includes a control device such as a CPU, a storage device such as a read-only memory (ROM) or a RAM, and an external storage device such as an HDD or a CD drive device, and has a hardware configuration using an ordinary computer.

A computer program to be executed by the signal collection/analysis computer of the present embodiment is provided by being recorded on a computer-readable recording medium such as a USB memory, a semiconductor storage device such as an SSD, or a digital versatile disc (DVD), as a file in an installable or executable format.

The computer program to be executed by the signal collection/analysis computer of the present embodiment may be configured to be provided by being stored on a computer connected to a network such as the Internet and downloaded via the network. The computer program to be executed by the signal collection/analysis computer of the present embodiment may be configured to be provided or distributed via the network such as the Internet.

The computer program of the signal collection/analysis computer of the present embodiment may be configured to be provided by being incorporated in advance into a ROM or the like.

What is claimed is:

1. A sensor unit of a machining device comprising:
    a piezoelectric sensor having a wire shape;
    a measurement part including an abutting surface formed with a guide groove that holds a part of the piezoelectric sensor and abutting a measurement object at predetermined pressure; and
    a cushioning holding part that holds, in a buffered state, another part of the piezoelectric sensor located outside the abutting surfaces.

2. The sensor unit of the machining device according to claim 1, wherein
    the guide groove is provided in plural, and the guide grooves have the same length.

3. The sensor unit of the machining device according to claim 1, wherein a width of the guide groove is set to a width for not preventing deformation of the piezoelectric sensor in the guide groove due to pressurization.

4. The sensor unit of the machining device according to claim 1, wherein the measurement part comprises:
    an abutting part having the abutting surface; and
    a pressurizing part that presses the abutting part against the measurement object at the predetermined pressure.

5. A sensor system comprising:
    a plurality of sensor units wherein each sensor unit comprises:
        a piezoelectric sensor having a wire shape;
        a measurement part including an abutting surface formed with a guide groove that holds a part of the piezoelectric sensor and abutting a measurement object at predetermined pressure;
    wherein each of the plurality of sensor units include the abutting surface disposed on a plane perpendicular to axes different from each other and intersecting each other;
    a plurality of amplifiers connected to the piezoelectric sensors of the sensor units to amplify and output signals of the piezoelectric sensors; and an analysis device that analyzes a detection state on the basis of the output signals of the plurality of amplifiers.

* * * * *